US007023586B2

(12) United States Patent
Eguchi (10) Patent No.: US 7,023,586 B2
(45) Date of Patent: Apr. 4, 2006

(54) COMMUNICATION APPARATUS AND E-MAIL COMMUNICATION METHOD

(75) Inventor: Masashi Eguchi, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 1020 days.

(21) Appl. No.: 09/740,118

(22) Filed: Dec. 18, 2000

(65) Prior Publication Data

US 2001/0005268 A1     Jun. 28, 2001

(30) Foreign Application Priority Data

Dec. 27, 1999   (JP)   ................................. 11-370977

(51) Int. Cl.
*H04M 11/00* (2006.01)
*H04M 3/00* (2006.01)
*H04N 1/00* (2006.01)

(52) U.S. Cl. ................. 358/402; 715/752; 379/265.09; 379/100.06

(58) Field of Classification Search ................ 358/402, 358/404, 405, 407, 440, 442, 468, 400, 401, 358/1.15, 1.18; 379/100.09, 100.01, 100.06, 379/265.09; 715/751, 752
See application file for complete search history.

(56) References Cited

U.S. PATENT DOCUMENTS

| | | | | |
|---|---|---|---|---|
| 5,339,156 A | * | 8/1994 | Ishii | 358/402 |
| 5,751,960 A | * | 5/1998 | Matsunaga | 709/206 |
| 5,859,967 A | * | 1/1999 | Kaufeld et al. | 713/200 |
| 5,956,521 A | * | 9/1999 | Wang | 710/35 |
| 6,020,980 A | * | 2/2000 | Freeman | 358/402 |
| 6,023,345 A | * | 2/2000 | Bloomfield | 358/402 |
| 6,028,982 A | * | 2/2000 | Toyoda et al. | 358/1.15 |
| 6,266,160 B1 | * | 7/2001 | Saito et al. | 358/407 |
| 6,384,927 B1 | * | 5/2002 | Mori | 358/1.15 |
| 6,466,330 B1 | * | 10/2002 | Mori | 358/1.15 |
| 6,658,456 B1 | * | 12/2003 | Shimoosawa | 709/206 |
| 6,683,698 B1 | * | 1/2004 | Toyoda et al. | 358/1.15 |
| 6,707,580 B1 | * | 3/2004 | Bloomfield | 358/402 |
| 6,731,410 B1 | * | 5/2004 | Saito et al. | 358/468 |
| 6,907,112 B1 | * | 6/2005 | Guedalia et al. | 379/88.17 |
| 2001/0056484 A1 | * | 12/2001 | Blumenstock | 709/224 |
| 2004/0114181 A1 | * | 6/2004 | Kim | 358/1.15 |
| 2004/0192263 A1 | * | 9/2004 | Tomikawa et al. | 455/413 |
| 2005/0055455 A1 | * | 3/2005 | Asher | 709/231 |
| 2005/0091385 A1 | * | 4/2005 | Nordstrom | 709/228 |
| 2005/0102363 A1 | * | 5/2005 | Yokomura et al. | 709/206 |

FOREIGN PATENT DOCUMENTS

| | | | |
|---|---|---|---|
| EP | 1469643 A2 | * | 10/2004 |
| JP | 09-121274 | | 5/1997 |
| JP | 10-28133 | * | 1/1998 |
| JP | 10-308766 | | 11/1998 |
| JP | 11/239171 | | 8/1999 |

* cited by examiner

*Primary Examiner*—Jerome Grant, II
(74) *Attorney, Agent, or Firm*—Hogan & Hartson L.L.P.

(57) ABSTRACT

A facsimile server connected to a mail server and a client over a network, and capable of sending and receiving an e-mail via the mail server. Certain data in a header of an e-mail to be sent to a recipient is used as identification data indicative of an origin of the e-mail. A controller identifies the origin of the e-mail based on the identification data upon receiving reception acknowledgement from the recipient. The facsimile server sends the reception acknowledgement to the client if it determines that the e-mail origin is the client. On the other hand, the facsimile server causes a printer to print the reception acknowledgement if it determines that the e-mail is originated from the facsimile server itself.

17 Claims, 11 Drawing Sheets

```
50A
Received: from abcdefg.co.jp([××××.××××.×.×××])
         by server. abcdefg.co.jp(××××××××××) with ESMTP id ABCDE
FGH)
         for <aaaa@abcdefg.co.jp>;Fri, 8 Sep 2000 10:19:01 +0900 (JST)
Date: Fri, 08 Sep 2000 09:52:41 +0900
From; aaaa@abcdefg.co.jp
Message−ID: <A1B2C3D4.12345678@abcdefg.co.jp>
Subject:
TO: aaaa <aaaa@abcdefg.co.jp>
References: <20000090.81001.9876543210@abcdefg.co.jp>
MIME−Version: 1.0
Content−Type: multipart/report; report−type=disposition−notification;  ─ a
```

Content — Type: text/plain; charset=iso — 2022 — jp
Content — Transfer — Encoding: 7bit This is a Return Receipt for the mail that you sent to
aaaa@abcdefg.co.jp Note: this Return Receipt only acknowledges that the message was displayed on the recipient's machine. There is no guarantee that the content has been read or understood.

Content — Type: message/disposition — notification; name="MDN12345.txt"
Content — Disposition: inline
Content — Transfer — Encoding:7bit Reporting — UA: Client — 1.abcdefg.co.jp; Mozilla 4.6 [ja] (Win95;I)
Final — Recipient: rfc822;aaaa@abcdefg.co.jp
Original — Message — ID: <20000908l001.9876543210@abcdefg.co.jp> — b
Disposition: manual — action/MDN — sent — manually; displayed

FIG. 9

```
Content — Type: text/rfc822 — headers; name="MDN12345.txt"
Content — Transfer — Encoding: 7bit
Content — Disposition: inline Received: from abcdefg.co.jp([××××.××××.×.×××])
         by server. abcdefg.co.jp(×××××××××××) with ESMTP id
ABCDEIJ
         for <aaaa@abcdefg.co.jp> ;Fri, 8 Sep 2000 10:18:49 +0900 (JST)
Message — ID: <20000908010018.987654321 0@abcdefg.co.jp>
Disposition — Notification — To: aaaa <aaaa@abcdefg.co.jp>
Date: Fri, 08 Sep 2000 09:52:28 +0900
From: aaaa <aaaa@abcdefg.co.jp>
MIME — Version: 1.0
To: aaaa@abcdefg.co.jp
Subject:
Content — Type: text/plain; charset=iso — 2022 — jp
Content — Transfer — Encoding: 7bit
```

```
Received: from host(host)
         by server.abcdefg.co.jp(×××××××××××××××) with internal id ABCDEFGH;
         Fri, 8 Sep 2000 10:18:49 +0900 (JST)
Date: Fri, 8 Sep 2000 10:18:49 +0900 (JST)
From; Mail Delivery Subsystem <MAILER-DAEMON>
Subject:
Message-ID: <20000908011B.ABCDEFGH.ABCDEFGH@server.abcdefg.co.jp>
TO: aaaa <aaaa@abcdefg.co.jp>
MIME-Version: 1.0
Content-Type: multipart/report; report-type=delivery-status;  ⎤ d
Auto-Submitted: auto-generated(return-receipt)

This is a MIME-encapsulated message
```

The original message was received at Fri, 8 Sep 2000 10:18:49 +0900 (JST) from [×××.×××.×.×××]

——— The following addresses had successful delivery notifications ———
<aaaa@abcdefg.co.jp> (successfully delivered to mailbox)

——— Transcript of session follows———
<aaaa@abcdefg.co.jp>...Successfully delivered

Content—Type: message/delivery—status

Original—Envelope—Id: <20000908I001.1122334455@abcdefg.co.jp> —e
Reporting—MTA : dns; server.abcdefg.co.jp
Received—From—MTA: DNS;[×××.×××.×.×××]
Arrival—Date: Fri, 8 Sep 2000 10:18:49 +0900 (JST)

Original—Recipient: rfc822;aaaa@abcdefg.co.jp
Final—Recipient: RFC822; <aaaa@abcdefg.co.jp>
Action: delivered(to mailbox)
Status: 2.1.5
Last—Attempt—Data: Fri, 8 Sep 2000 10:18:49 +0900 (JST)

Content — Type: text/rfc822 — headers

Return — Path: <aaaa@abcdefg.co.jp>
Received: from abcdefg.co.jp([×××.×××..×××..×.×××])
  by server.abcdefg.co.jp(×××××××××××) with ESMTP id ABCDEFGH
  for <aaaa@abcdefg.co.jp>;Fri, 8 Sep 2000 10:18:49 +0900 (JST)
Message — ID: <20000908010011.1122334455@abcdefg.co.jp>
Disposition — Notification — To: aaaa <aaaa@abcdefg.co.jp>
Date: Fri, 08 Sep 2000 09:52:28 +0900
From: aaaa <aaaa@abcdefg.co.jp>
MIME — Version: 1.0
To: aaaa@abcdefg.co.jp
Subject:
Content — Type: text/plain; charset=iso — 2022 — jp
Content — Transfer — Encoding: 7bit

COMMUNICATION APPARATUS AND E-MAIL COMMUNICATION METHOD

CROSS REFERENCES TO RELATED APPLICATIONS

This application claims priority of Japanese Patent Application No. 11-370977 filed in JPO on Dec. 27, 1999 under 35 USC 119, the entire disclosure of which is incorporated herein by reference.

BACKGROUND OF THE INVENTION

1. Field of the Invention

The present invention relates to communication apparatus connecting at least a mail server and clients over a communication network and performing e-mail communication via the mail server, and e-mail communication method suitable for such apparatus.

2. Description of the Related Art

Recently, prevailing of communication networks such as internet is remarkable. Even personal computers in houses use WWW (World Wide Web), e-mail, network news, etc. very frequently.

In offices, a communication network such as LAN connects a router for connection to the internet, a mail server, a facsimile server and clients, thereby establishing a communication network system. When the facsimile server receives data from a client, it transfers data (e.g., facsimile image data and e-mail) over PSTN or to the mail server based on designation of recipient (e.g., facsimile number and e-mail address) made by the client.

This type of facsimile server has an ordinary facsimile function so that it can also transmit image, which is scanned by an associated scanner, to a remote facsimile machine or a remote party in the form of e-mail.

The e-mail communication over the internet has specifications defined by RFC (request for comments). According to RFC, an e-mail transmitter can have an optional function of receiving a return e-mail that notifies reception of the e-mail. This reception acknowledgement (return receipt) is either MDN (Message Disposition Notification) or DSN (Delivery Status Notification). MDN is set to a respective e-mail by the transmitter, and DSN is set to the mail server by a command from the transmitter.

MDN notifies that a recipient of an e-mail has received (or printed or seen) the e-mail. On the other hand, DSN is a notification returned from a mail server at the most downstream stage of the network. DSN is sent back from a recipient provider that has a mail server, if the e-mail has properly reached the recipient. If the e-mail is not delivered to the recipient, a server where malfunctioning occurs issues a failure notification.

The above described network system has the following problems. The facsimile server receives image data from a client and sends it in the form of e-mail. The facsimile server can also scan image data with its scanner and send it in the form of e-mail. These two e-mails are accompanied by an address of the facsimile server. Thus, the receipt acknowledgement is directed to the address of the facsimile server. Accordingly, when the facsimile server sends the scanned data, the reception acknowledgement is returned to the correct data transmitter. On the other hand, however, when the facsimile server transfers the data from the client, the acknowledgement is not returned to the correct data origin, i.e., client, but the relay station, i.e., facsimile server, since the facsimile server cannot identity the client.

SUMMARY OF THE INVENTION

An object of the present invention is to provide a communication apparatus that can overcome the above-described problems. Specifically, a primary object of the present invention is to correctly determine who is a true data transmitter (client or communication apparatus itself) when receiving reception acknowledgement from a recipient or a computer on a network in response to an e-mail, and send the reception acknowledgement to the true transmitter.

Another object of the present invention is to provide an e-mail communication method suitable for such communication apparatus.

According to one aspect of the present invention, there is provided a communication apparatus connected to a mail server and at least one client over a communication network such that it can send and receive an e-mail via the mail server, including a controller for appending identification data, which indicates an origin of an e-mail (client or communication apparatus itself), to the e-mail before sending the e-mail to a recipient. The communication apparatus determines the e-mail origin based on the appended identification data upon receiving a reception acknowledgement e-mail returned from the recipient, a computer on a network or the like.

When the communication apparatus receives an e-mail from a client, it transfers the e-mail to the mail server, and the e-mail is subsequently transmitted to a designated recipient. The communication apparatus is also capable of scanning an image by its scanner and sending it to a recipient via the mail server.

The identification data may be existing data such as a message ID in a header of the e-mail to be sent. If non-existing data should be used as the identification data, it must be appended to the reception acknowledgement e-mail.

The controller sends the reception acknowledgement e-mail to the client if it determines that the origin of the e-mail is the client, and causes a printer to print the reception acknowledgement e-mail if it determines that the e-mail is originated the communication apparatus.

According to another aspect of the present invention, there is provided a communication method suitable for a communication apparatus connectable to a mail server and at least one client over a network, and capable of sending and receiving an e-mail via the mail server, including the steps of appending identification data, which indicates an origin of an e-mail (client or communication apparatus itself), to the e-mail before sending the e-mail to a recipient, and identifying an origin of an e-mail based on the identification data associated with a reception acknowledgement e-mail returned from a recipient.

According to a still another aspect of the present invention, there is provided a communication apparatus capable of sending and receiving an e-mail including: a first unit for sending a first e-mail to a recipient, the first e-mail being originated from the communication apparatus itself, a second unit for receiving a second e-mail and transferring it to a recipient, the second e-mail being originated from other than the communication apparatus; and a controller for appending first identification data, which indicates an origin of the second e-mail, to the second e-mail before sending the second e-mail to the recipient, identifying the origin of the second e-mail based on the first identification data appended to a reception acknowledgement e-mail returned to the communication apparatus, and identifying an origin of the first e-mail based on second identification data included in the first e-mail and associated with the reception acknowledgement e-mail. A user may determine the first and second identification data. The origin of the second e-mail may be a client connected to LAN. The controller may cause the communication apparatus to send the reception acknowledgement e-mail to the client if it determines that the origin of the e-mail is the client, and may cause a printer to print the reception acknowledgement e-mail if it determines that the origin of the e-mail is the communication apparatus. The identification data may be included in a message ID of the e-mail. The communication apparatus may be a facsimile server.

Other objects, advantages and benefits of the present invention will become apparent to those skilled in the art to which the present invention pertains from the subsequent detailed description and the appended claims, taken in conjunction with the accompanying drawings

DETAILED DESCRIPTION OF THE INVENTION

An embodiment of the present invention will now be described with reference to the accompanying drawings.

Figure 1:
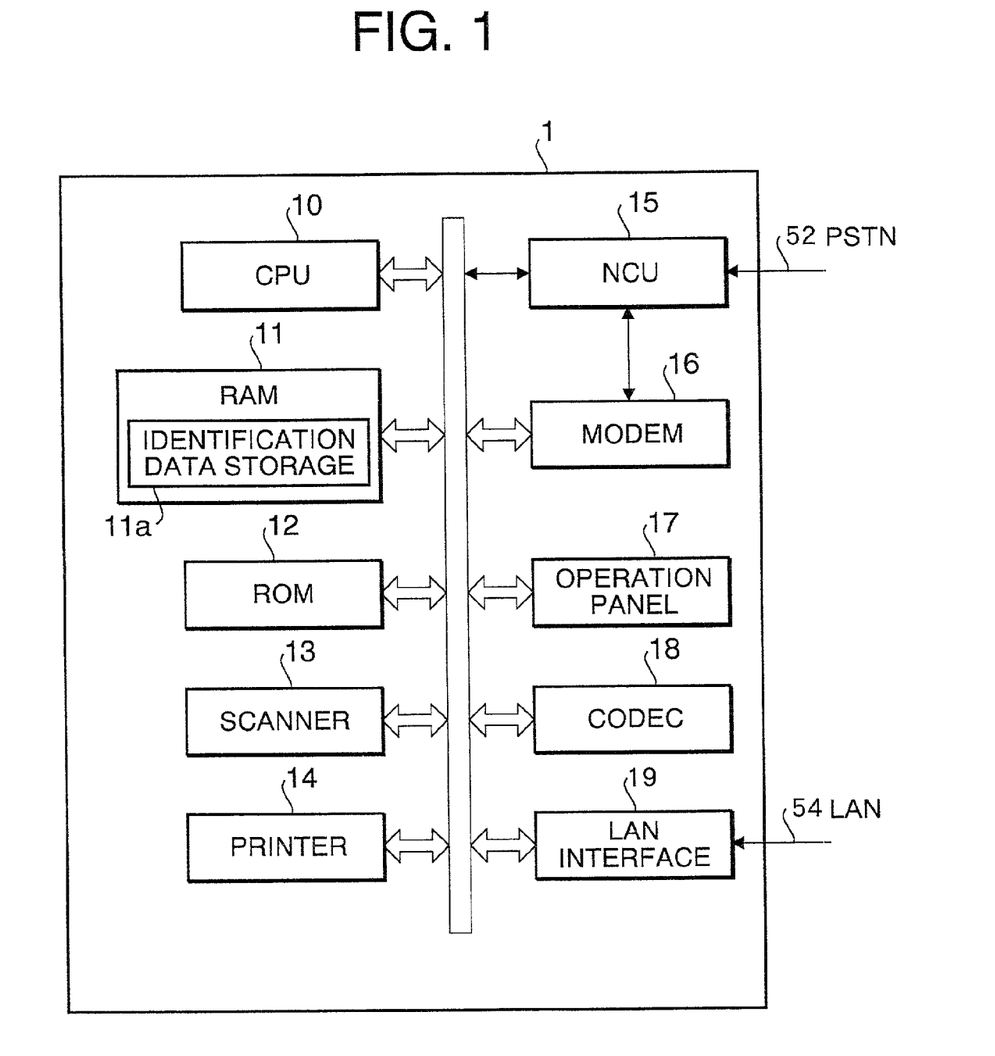
FIG. 1 is a block diagram schematically showing a structure of communication apparatus (facsimile server) according to the present invention.
Figure 2:
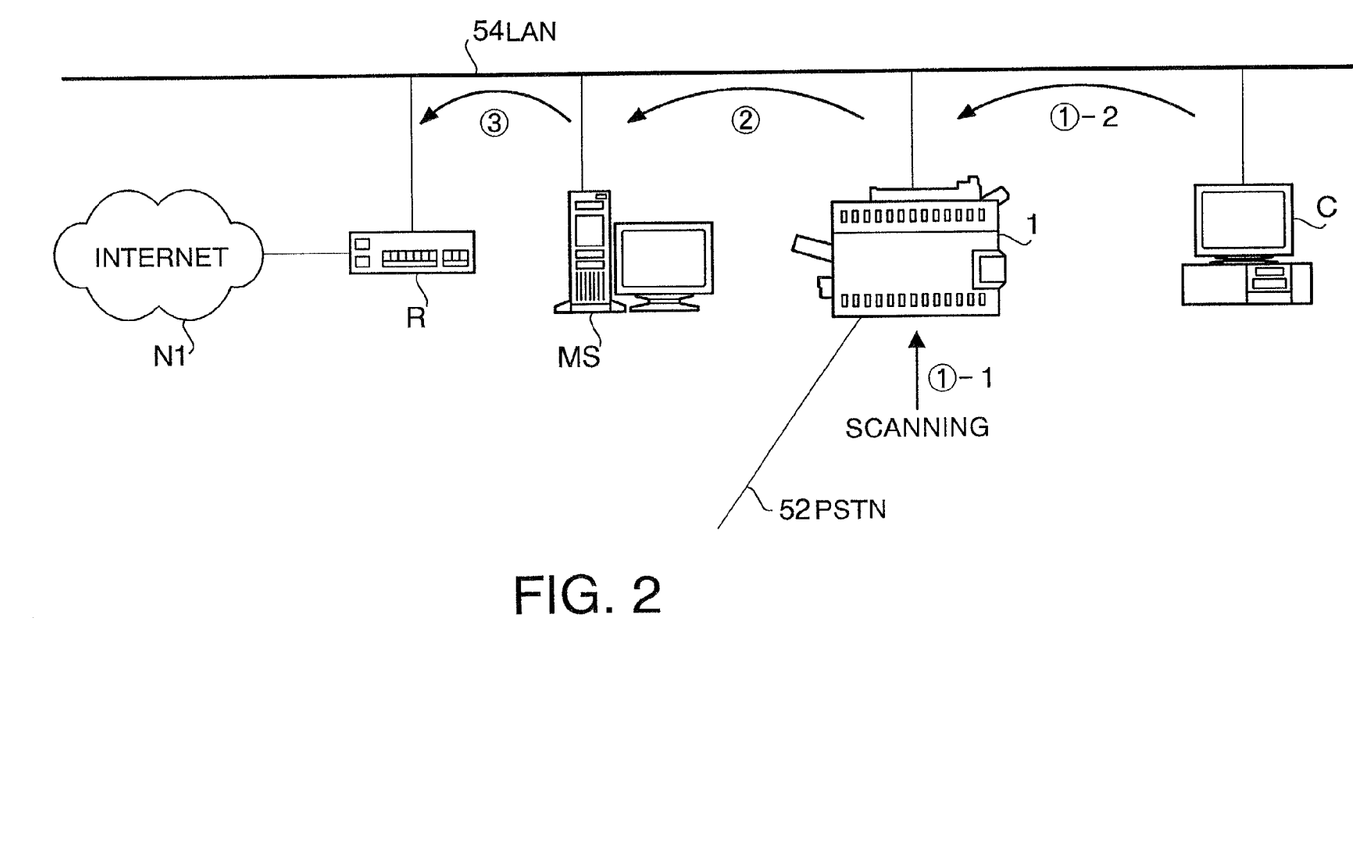
FIG. 2 is a diagram of communication network including the facsimile server shown in FIG. 1.

Referring to FIG. 1, illustrated is a block diagram of a facsimile server 1, which is a communication apparatus of the invention. FIG. 2 schematically illustrates a communication network system incorporating the facsimile server 1.

The facsimile server 1 is connected to a telephone line (PSTN) 52 and LAN 54. To LAN 54, connected are a router R for connection to the internet N1, a mail server MS, and one or more clients C (only one client is illustrated) as shown in FIG. 2. Clients are personal computers.

As the facsimile server 1 receives data from the client C as indicated by the arrow ①-2, it transfers the data to a remote facsimile machine over PSTN 52 based on a recipient designated by the client C (designation is made by a facsimile number), or transfers the data in the form of e-mail to the mail server MS as indicated by the arrow ②, and in turn to the router as indicated by the arrow ③ if the designation is made by an e-mail address. The facsimile server 1 is also able to scan an image by its scanner 13 (FIG. 1) as indicated by the arrow ①-1, and sends it by facsimile over PSTN 52 or by e-mail over internet N1.

When the facsimile server 1 itself prepares and sends an e-mail, the e-mail proceeds to the mail server MS, router R and internet N1. It should be noted that a network for the e-mail is the internet N1 in the illustrated embodiment, but the present invention is not limited in this regards. For example, the e-mail may be transmitted through a personal computer communication service.

When the facsimile server 1 receives image data from a remote facsimile machine over PSTN 52, it can send it to another device over PSTN 52 in the form of facsimile data or to a remote device over LAN 54 in the form of e-mail according to signal setting found in the respective protocol. The facsimile server 1 can also print the data from its printer 14 (FIG. 1).

CPU 10 controls hardware elements of the facsimile server 1. RAM 11 temporarily stores image data and other data such as those registered by a user (e.g., telephone directory data) and needed for processing programs. ROM 13 stores control programs. A scanner 13 scans an image from a document and converts it to image data. A printer 14 prints image received over PSTN 52 and LAN 54 and scanned by the scanner 13 on a recording sheet.

NCU 15 transmits a dialing signal to PSTN 52 and controls connection to PSTN 52. A modem 16 modulates and demodulates signals for facsimile communication. An operation panel 17 includes a liquid crystal display for displaying conditions of the facsimile server 1 and various keys for instructing various operations, commands, numbers and symbols. CODEC 18 codes and decodes image data by MH, MR, MMR or other methods for facsimile communication, and converts a data format to TIFF for e-mail communication. A LAN interface 19 connects the facsimile server 1 to LAN 54 according to Ethernet or other standards.

It should be noted that application of the present invention is not limited to the illustrated facsimile server 1. The present invention is applicable to any communication devices that receive data from a client C and transfers it to the mail server MS for e-mail communication.

When the facsimile server 1 transfers an e-mail, it attaches identification data, which indicates the origin of the data, i.e., whether it is originated from the client C or itself (facsimile server 1). When the facsimile server 1 receives an e-mail of reception acknowledgement (return receipt), it identifies the origin of the data based on the appended identification data.

Specifically, when the facsimile server 1 sends an e-mail, it stores the identification data to be appended to the e-mail in an identification data storage 11a of RAM 11. When the facsimile server 1 receives the acknowledgement e-mail, it refers to the identification data storage 11a to determine the origin of the data. It should be noted that it is not necessary for the facsimile server 1 to store identification data in the storage 11a every time it sends an e-mail if particular identification data have been assigned to particular data origins or there are certain rules (e.g., calculation equations) to determine data origins.

The identification data allows the facsimile server 1 (or its CPU 10) to identify the origin of the data, the client C or the facsimile server 1. Of course, if there are a plurality of clients C connected to LAN 54, the identification data can indicate which one of the clients C is the data origin.

If existing information in the e-mail data is used as the identification data, it is unnecessary to make a new agreement between the mail server MS (or other devices) and facsimile server 1. If identification data is newly attached to the e-mail, that identification data should always be attached to the acknowledgement e-mail.

Upon receiving the identification data together with the acknowledgement e-mail, if the facsimile server 1 determines that the data origin is a client C, it transfers the acknowledgement e-mail to that client C. If the facsimile server 1 determines that the data origin is itself, it prints the acknowledgement e-mail from the printer 14.

In this manner, when the facsimile server 1 transfers an e-mail from the client C to a recipient and receives acknowledgement, it can inform the client C of safe receipt.

Now, the operation of the facsimile server 1 will be described when a conventional message ID attached to a header of e-mail is utilized as the identification data.

Figure 3A:
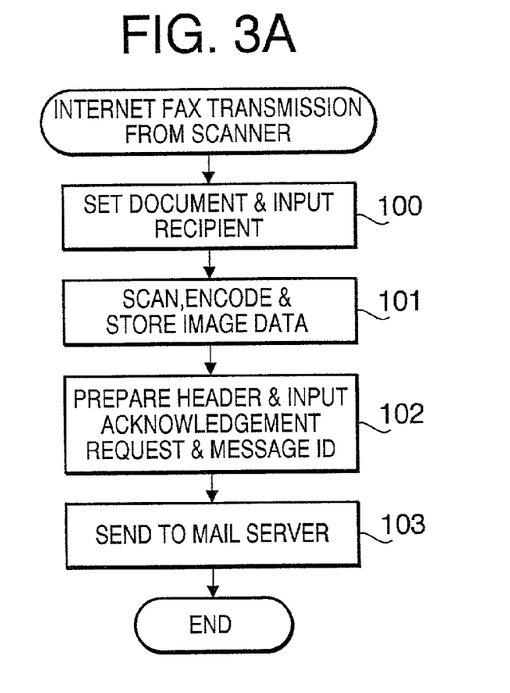
FIG. 3A illustrates a flowchart when the facsimile server shown in FIG. 1 scans an image and sends it to a remote device by e-mail.
Figure 3B:
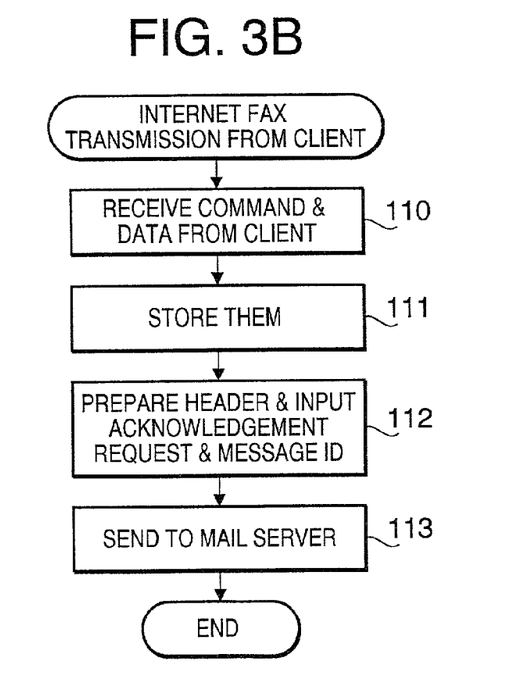
FIG. 3B illustrates a flowchart when the facsimile server receives data from a client and transfers it to a remote device by e-mail.

Referring to FIGS. 3A and 3B, illustrated are flowcharts when the facsimile server 1 sends an e-mail. Here, the term "internet fax transmission" means that image data is sent over the internet N1 in the form of e-mail.

In FIG. 3A, data scanned by the scanner 13 is sent to a recipient by e-mail. First, a document is loaded into the scanner 13 and a recipient (e.g., e-mail address or facsimile number) is input from the control panel 17 at step 100. Then, the scanner 13 reads in the image from the document, CODEC 18 encodes it and RAM 11 stores data in an image memory (not shown) at step 101. Subsequently, an e-mail header is prepared, a request for reception acknowledgement is included, a message ID indicating that the data origin is the facsimile server 1 is put in the header at step 102, and the e-mail is sent to the mail server MS at step 103.

FIG. 3B shows a case where data from the client C is transferred to a recipient through the facsimile server 1. Upon receiving a command from the client C and data at step 110, the facsimile server 1 stores the data in the image memory of RAM 11 at step 111. The facsimile server 1 then prepares an e-mail header, and inputs an acknowledgement request and a message ID, which indicates that the data origin is the client C, into the header at step 112. After that, the facsimile server 1 sends the e-mail to the mail server MS at step 113.

Figure 4:
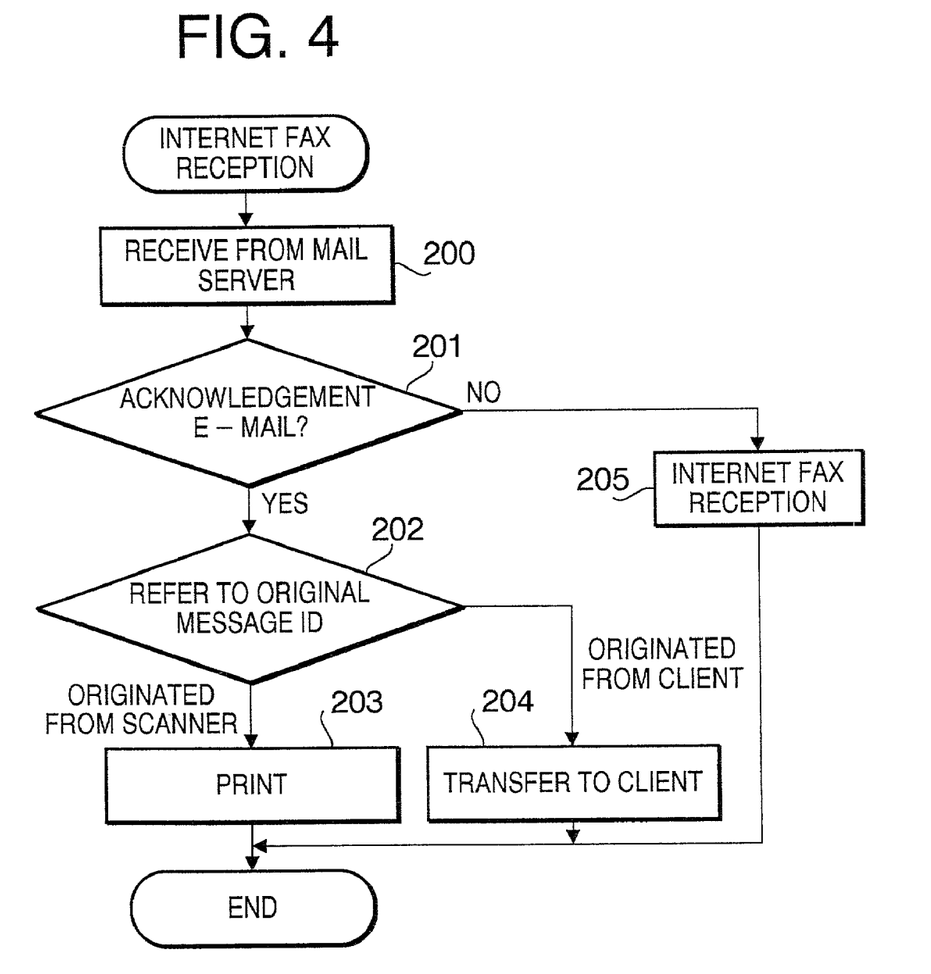
FIG. 4 illustrates a flowchart when the facsimile server receives an e-mail from a remote device.

Referring to FIG. 4, illustrated is a case where the facsimile server 1 receives an e-mail from the mail server MS.

As the facsimile server 1 receives an e-mail from the mail server MS at step 200, it determines whether it is an acknowledgement e-mail or an ordinary e-mail at step 201. If it is an acknowledgement e-mail, the facsimile server 1 refers to the original message ID included in the header to determine whether the data origin is the scanner 13 or the client C at step 202. If the original message ID indicates that the data is originated from the scanner 13, the e-mail is printed from the printer 14 at step 203. On the other hand, if the original message ID indicates that the data origin is the client C, the facsimile server 1 transfers the e-mail to the client C at step 204. If the e-mail is not the acknowledgement e-mail (No at step 201), the facsimile server 1 transfers the e-mail to a designated recipient at step 205. This is the internet fax reception procedure. In this case, if the designated recipient is specified by the address of the facsimile server 1, the received e-mail is printed from the printer 14.

It should be noted that if the facsimile server 1 receives an acknowledgement e-mail in response to an e-mail originated from the scanner 13, it may edit the content of the acknowledgement e-mail before printing. This may rearrange the acknowledgement e-mail for easier understanding when seen by a user.

Figure 5:
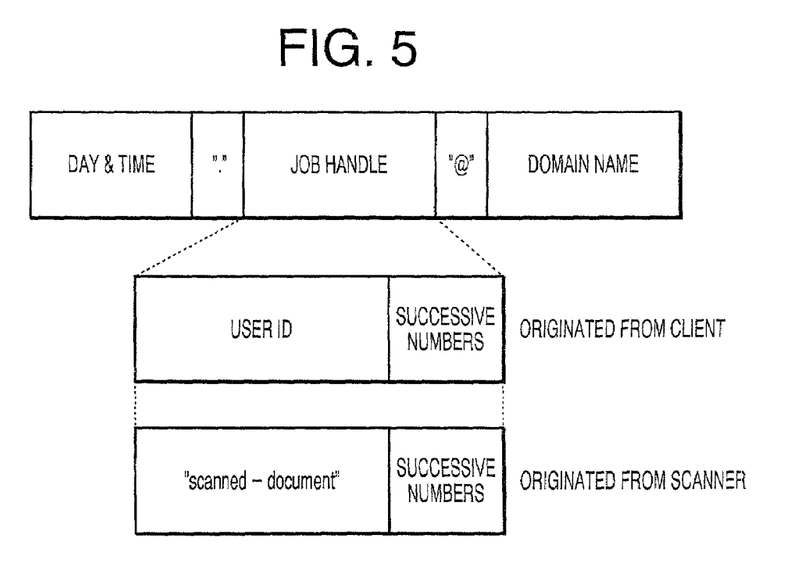
FIG. 5 illustrates an example of message ID.

Referring to FIG. 5, illustrated is a structure of the message ID, which is the identification data. The message ID includes day and time, job handle, domain name and other information. The facsimile server 1 determines the origin of the data based on the job handle.

The job handle includes a user ID of the client C and successive numbers of the e-mail if the data is originated from the client. If the data is originated from the scanner 13, the job handle includes a series of letters such as "scanned-document", which means that the data is prepared by scanning a document by the scanner 13, and successive numbers of the e-mail. The domain name in the message ID is a domain name of the facsimile server 1.

Figure 6:
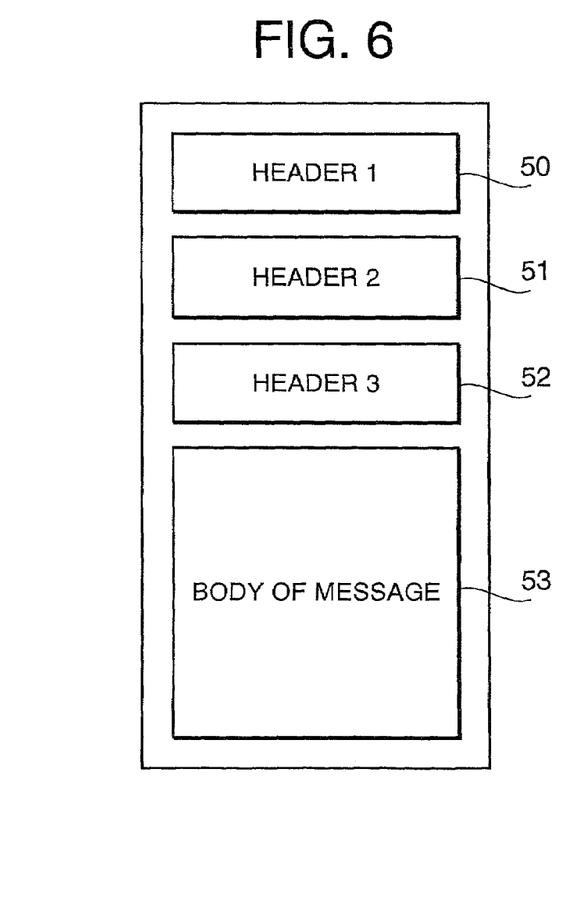
FIG. 6 illustrates an arrangement of acknowledgement e-mail.

The content of the acknowledgement e-mail will be described in reference to FIG. 6.

The e-mail includes one or more headers 50, 51 and 52, and an original mail message 53. FIGS. 7, 8A, 8B and 9 illustrate in combination a single acknowledgement e-mail when it is MDN, and FIGS. 10, 11A, 11B and 12 illustrate in combination an acknowledgement e-mail when it is DSN. The arrangement of the acknowledgement e-mail is that shown in FIG. 6.

Figure 7:
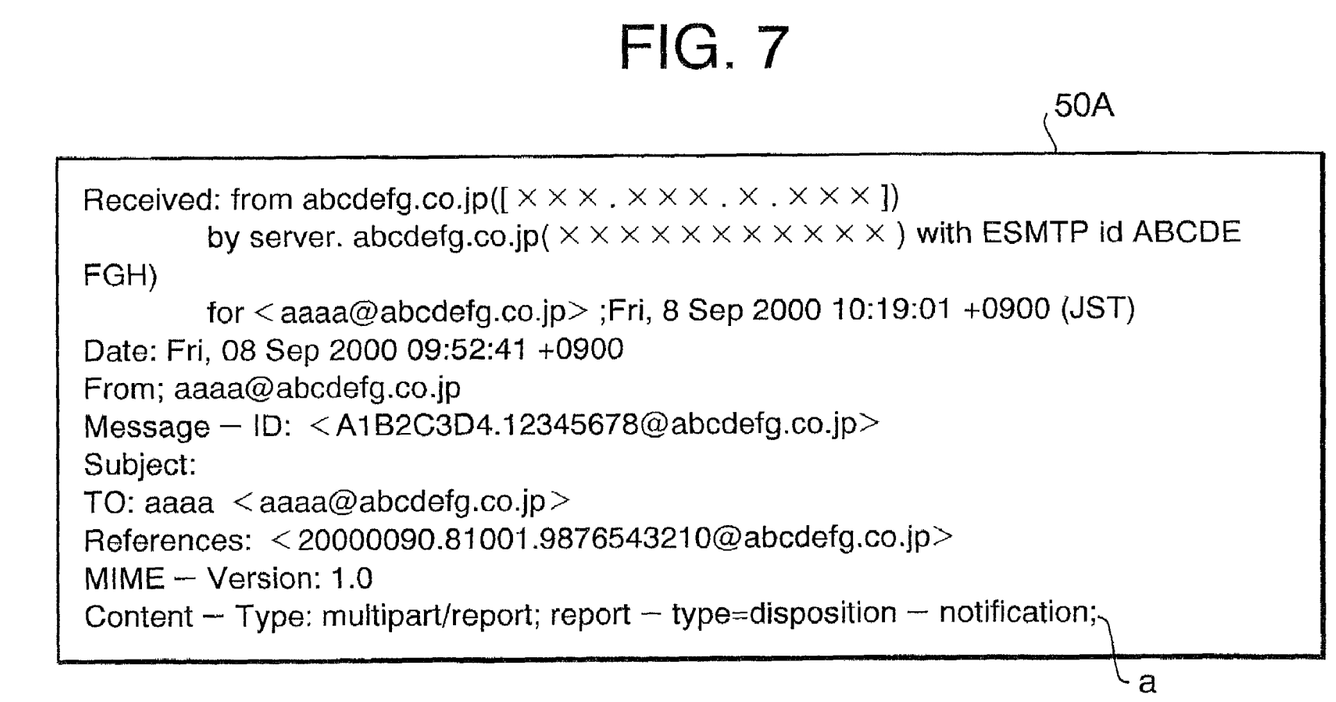
FIG. 7 illustrates a first header of an acknowledgement e-mail when the acknowledgement e-mail is MDN.
Figure 8A:
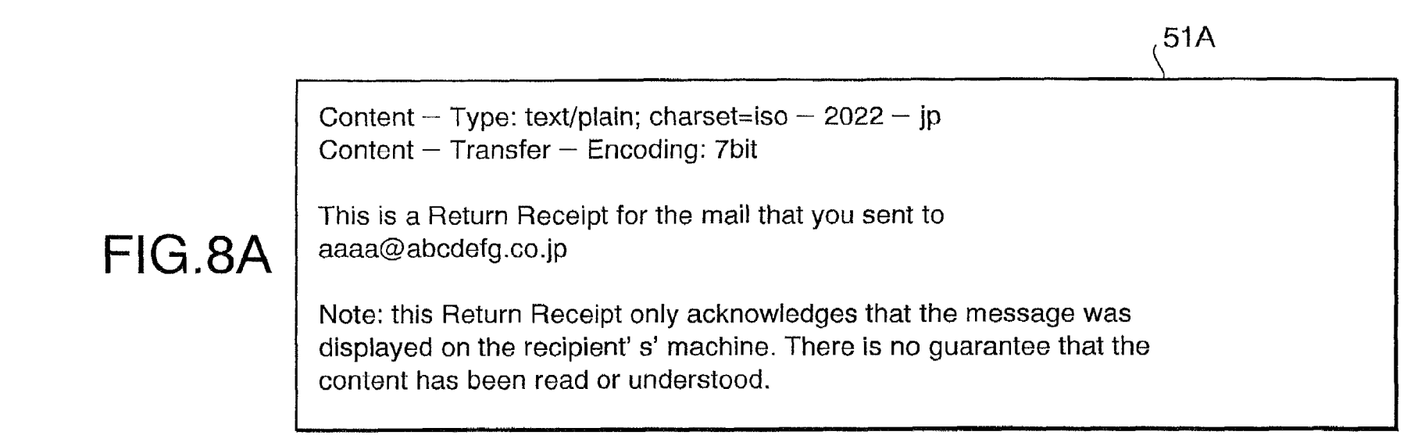
FIG. 8A illustrates a second header of such acknowledgement e-mail.
Figure 8B:
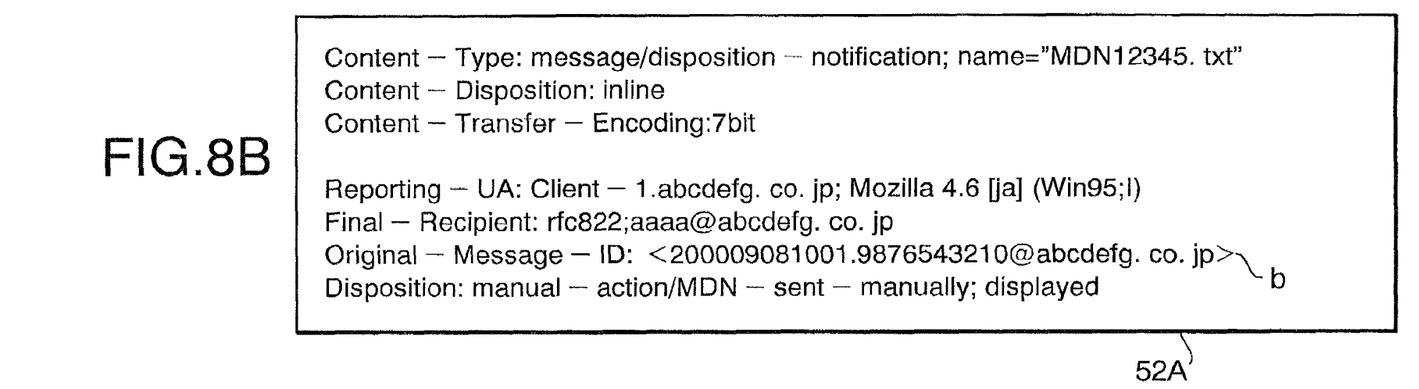
FIG. 8B illustrates a third header of such acknowledgement e-mail.
Figure 9:
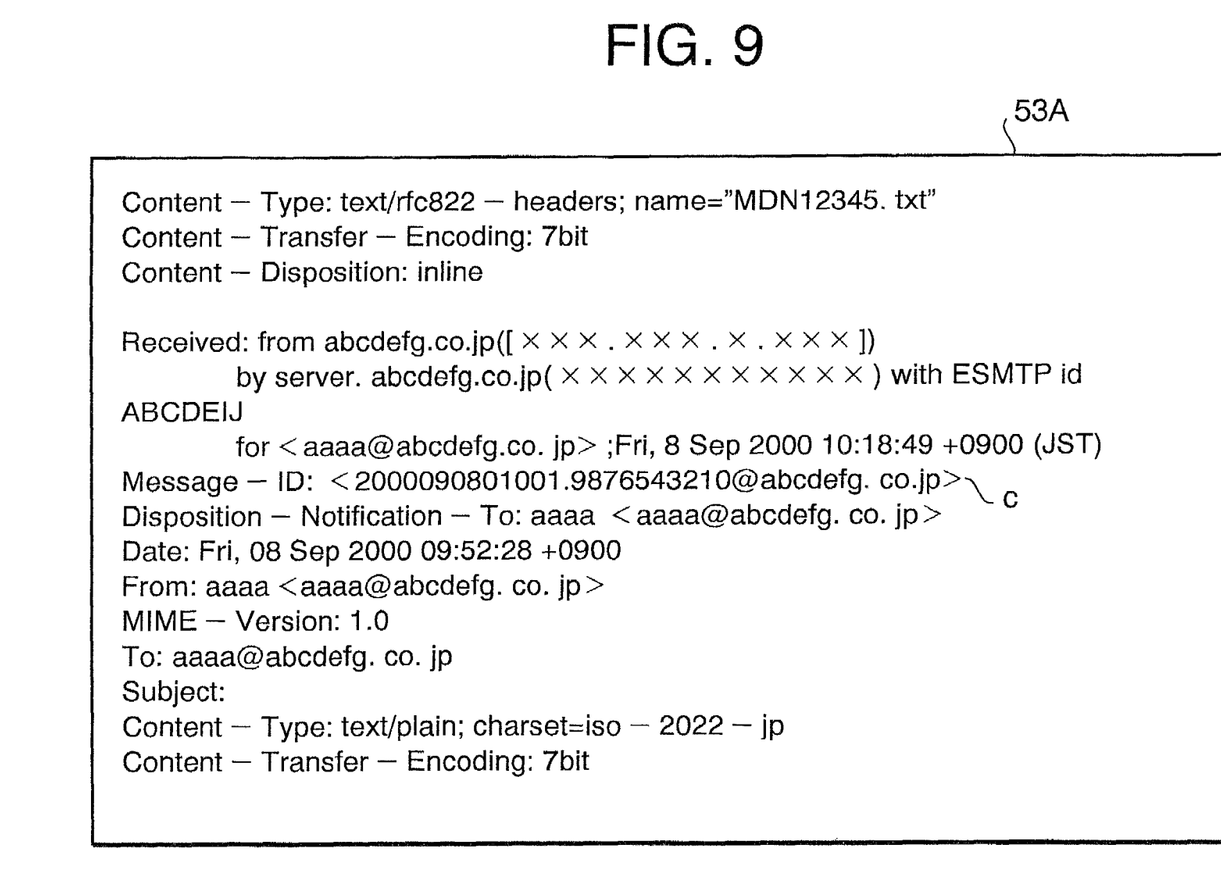
FIG. 9 illustrates a transmitted message included in the acknowledgement e-mail.

Referring to FIG. 7, the first header 50A (header 1 in FIG. 6) includes data "a" indicating that this acknowledgement e-mail is MDN. The second header 51A shown in FIG. 8A contains an e-mail content by sentence. The second header 51A is text data readable by a user. The third header 52A shown in FIG. 8B has an original message ID "b" of the e-mail. The facsimile server 1 determines a data origin based on the message ID. FIG. 9 shows transmitted messages 53A attached to the e-mail. The facsimile server 1 is also capable of identifying the data origin from the message ID "c" included here.

Figure 10:
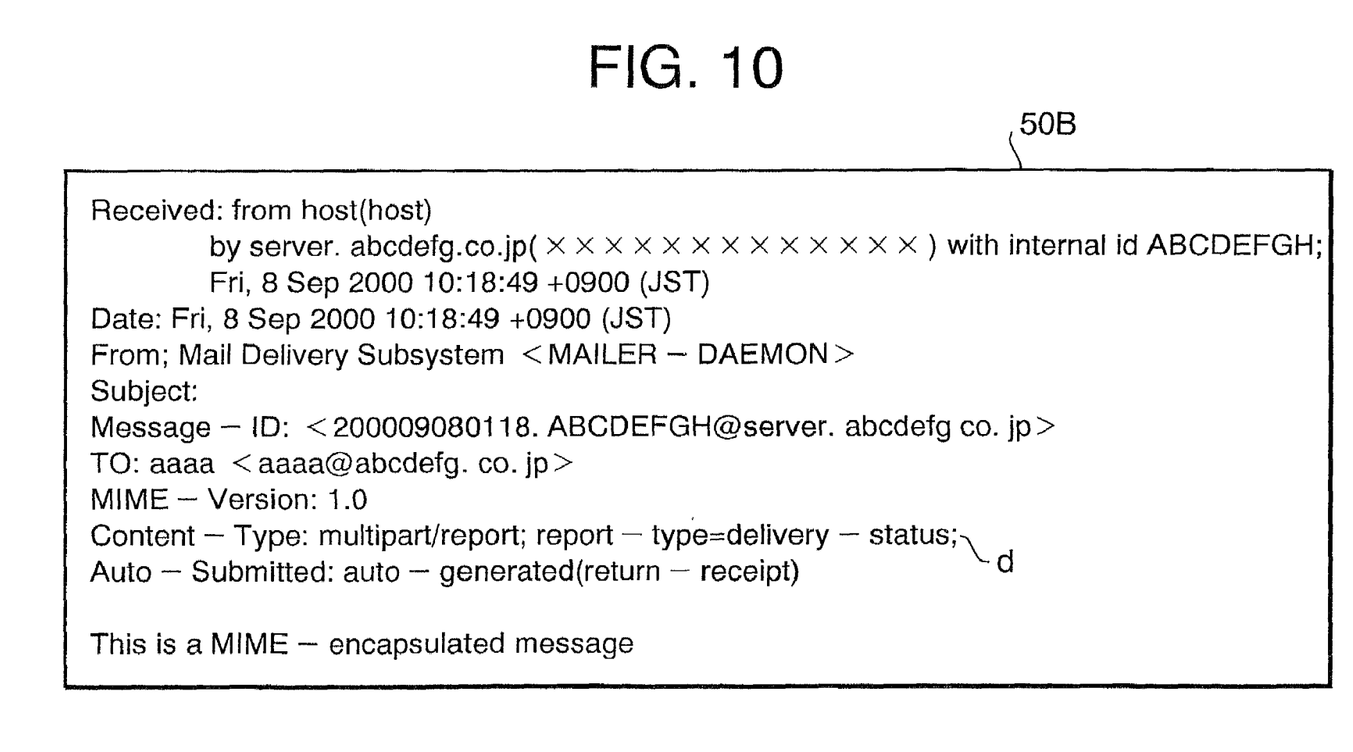
FIG. 10 illustrates a first header of the acknowledgement e-mail when the acknowledgement e-mail is DSN.
Figure 11A:
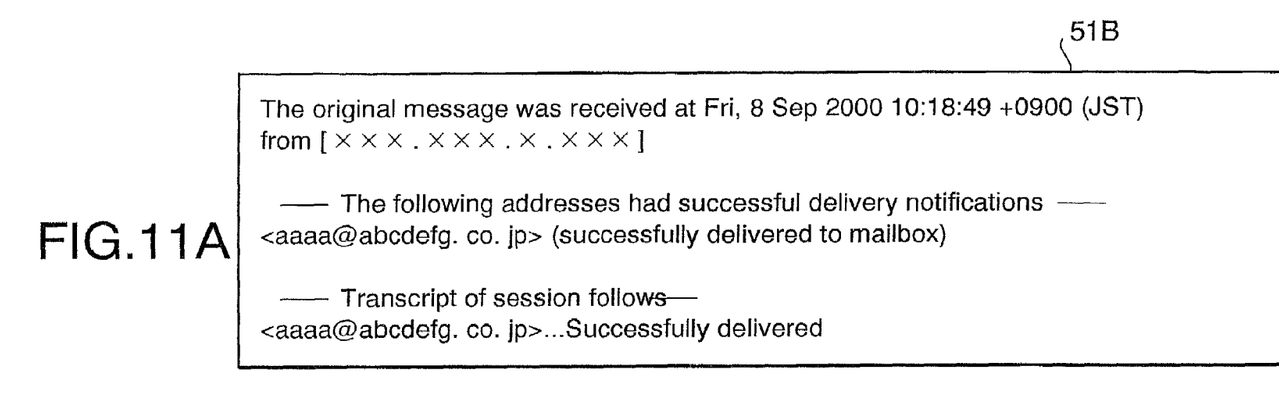
FIG. 11A illustrates a second header of such acknowledgement e-mail.
Figure 11B:
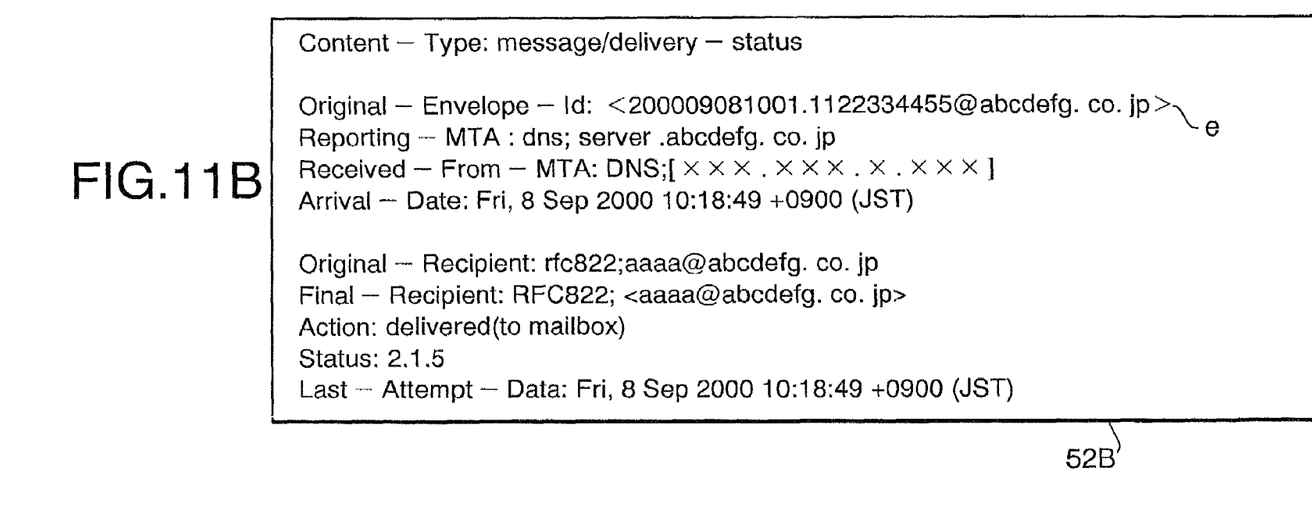
FIG. 11B illustrates a third header of such acknowledgement e-mail.
Figure 12:
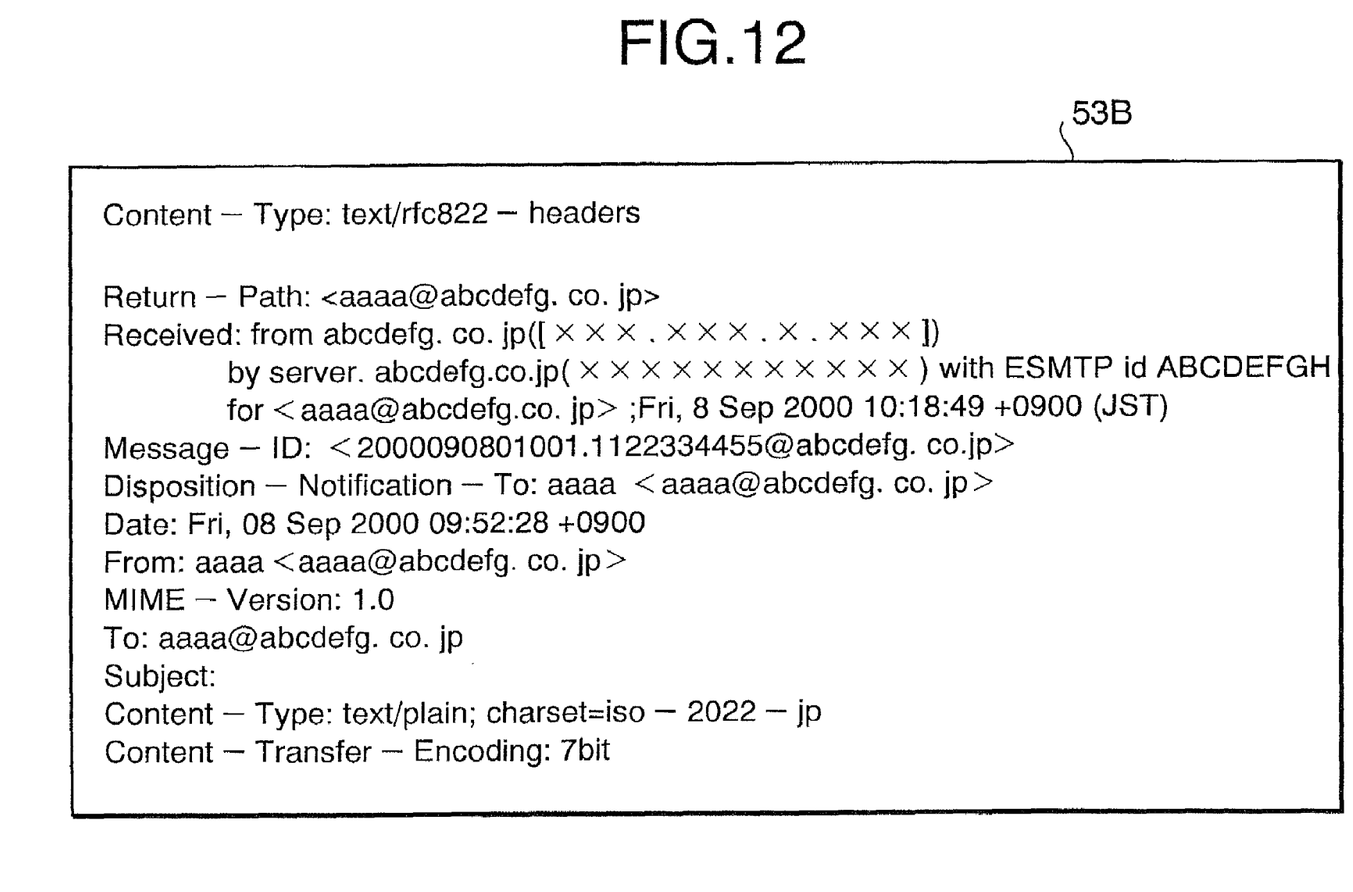
FIG. 12 illustrates a transmitted message.

The first header 50B shown in FIG. 10 has data "d" indicating that this acknowledgement e-mail is DSN. The second header 51B shown in FIG. 11A includes an e-mail content by sentence. The third header 52B shown in FIG. 11B includes an original message ID "e." The facsimile server 1 refers to this message ID to determine the data origin. FIG. 12 illustrates messages 53B attached to the e-mail.

What is claimed is:

1. A communication apparatus capable of sending and receiving an e-mail comprising:
   a first unit for sending a first e-mail to a recipient, the first e-mail being originated from the communication apparatus itself;
   a second unit for receiving a second e-mail and transferring it to a recipient, the second e-mail being originated from a client outside of the communication apparatus; and
   a controller for appending first identification data, which indicates the client as the origin of the second e-mail, to the second e-mail before sending the second e-mail to the recipient, identifying the client as the origin of the second e-mail based on the first identification data appended to a reception acknowledgement e-mail returned to the communication apparatus, and identifying the communication apparatus as the origin of the first e-mail based on second identification data included in the first e-mail and associated with the reception acknowledgement e-mail, wherein the controller causes the communication apparatus to send the reception acknowledgement e-mail to the client if it determines that the origin of the e-mail is the client, and causes a printer to print the reception acknowledgement e-mail if it determines that the origin of the e-mail is the communication apparatus.

2. The communication apparatus of claim 1, wherein a user determines the first and second identification data.

3. The communication apparatus of claim 2, wherein the identification data is included in a message ID of the e-mail.

4. The communication apparatus of claim 1, wherein the origin of the second e-mail is a client connected to LAN.

5. The communication apparatus of claim 3, wherein the identification data is included in a message ID of the e-mail.

6. The communication apparatus of claim 1, wherein the identification data is included in a message ID of the e-mail.

7. The communication apparatus of claim 1, wherein the identification data is included in a message ID of the e-mail.

8. The communication apparatus of claim 1, wherein the communication apparatus is a facsimile server.

9. A method suitable for a communication apparatus capable of sending and receiving an e-mail, comprising the step of:

A) (a-1) sending a first e-mail to a recipient, the first e-mail being originated from the communication apparatus itself, or (a-2) receiving a second e-mail and transferring it to a recipient, the second e-mail being originated from a client outside of the communication apparatus;

B) appending first identification data, which indicates the client as the origin of the second e-mail, to the second e-mail before sending the second e-mail to the recipient;

C) (c-1) identifying the client as the origin of the second e-mail based on the first identification data appended to a reception acknowledgement e-mail returned to the communication apparatus, or (c-2) identifying the communication apparatus as the origin of the first e-mail based on second identification data included in the first e-mail and associated with the reception acknowledgement; and D) causing a printer to print the reception acknowledgement e-mail if it determines that the origin of the e-mail is the communication apparatus.

10. The method of claim 9 further including the step of allowing a user to determine the first and second identification data.

11. The method of claim 10, wherein the identification data is included in a message ID of the e-mail.

12. The method of claim 9, wherein the origin of the second e-mail is a client connected to LAN.

13. The method of claim 12, wherein the identification data is included in a message ID of the e-mail.

14. The method of claim 9, wherein the identification data is included in a message ID of the e-mail.

15. The method of claim 14, wherein the identification data is included in a message ID of the e-mail.

16. The method of claim 9, wherein the communication apparatus is a facsimile server.

17. The method of claim 9 further including the step of sending the reception acknowledgement e-mail to the client if it determines that the origin of the e-mail is the client.

* * * * *